United States Patent [19]

Ohkami

[11] Patent Number: 5,603,027
[45] Date of Patent: Feb. 11, 1997

[54] COMPUTER PROGRAM VERSION MANAGEMENT SYSTEM WITH REDUCED STORAGE SPACE AND ENABLING MULTIPLE PROGRAM VERSIONS TO HAVE THE SAME NAME

[75] Inventor: Takahide Ohkami, Newton, Mass.

[73] Assignee: Mitsubishi Electric Information Technology Center America, Inc., Cambridge, Mass.

[21] Appl. No.: 561,554

[22] Filed: Nov. 21, 1995

Related U.S. Application Data

[63] Continuation of Ser. No. 315,286, Sep. 29, 1994, abandoned.

[51] Int. Cl.$^6$ .................................................. G06F 9/00
[52] U.S. Cl. ................ 395/619; 395/616; 364/DIG. 1; 364/286; 364/282.3; 364/231.6
[58] Field of Search ............................ 395/619, 616; 364/DIG. 1

[56] References Cited

U.S. PATENT DOCUMENTS

| | | | |
|---|---|---|---|
| 4,558,413 | 12/1985 | Schmidt et al. | 364/300 |
| 4,809,170 | 2/1989 | Leblang et al. | 364/200 |
| 4,912,637 | 3/1990 | Sheedy et al. | 364/300 |
| 5,278,979 | 1/1994 | Foster et al. | 395/600 |
| 5,357,631 | 10/1994 | Howell et al. | 395/600 |

OTHER PUBLICATIONS

"How to make more of a good thing". Livinston, James Digital Review vol.: v5 issue n18, Sep. 26, 1988 pp. 158–159.
"Making sense out of make". Keuffel, Warren Mar. 1993 Computer Language vol.: v10 Issue n3 pp. 123–127.
"Making it with DOS Make". Burnette, David Jul. 1989 Computer Language vol.: V6 issue: n7 pp. 10–15.
"The Unix operating system". Kaare Christian, 1983 The Rockefeller University of Ny. pp. 141–149.

*Primary Examiner*—Thomas G. Black
*Assistant Examiner*—Jean R. Homere
*Attorney, Agent, or Firm*—Robert K. Tendler, Esq.

[57] ABSTRACT

A computer program version update system reduces storage space usage and enables calling programs to invoke any version of a program using the same name by storing only modified modules of a program for different program versions. Multiple versions of a program can thus have the same name. Any version of the program may be constructed from the modules upon command with a user issuing such a command and including a version number corresponding to the requested version as a parameter to invoke a program construction procedure.

2 Claims, 11 Drawing Sheets

COMPUTER PROGRAM VERSION MANAGEMENT SYSTEM WITH REDUCED STORAGE SPACE AND ENABLING MULTIPLE PROGRAM VERSIONS TO HAVE THE SAME NAME

This is a continuation of application Ser. No. 08/315,286 filed on Sep. 29, 1994, and now abandoned.

FIELD OF THE INVENTION

This invention generally relates to computer systems for managing version updates of a computer program and for constructing a computer program from structured modules.

BACKGROUND OF THE INVENTION

Most current systems have difficulties handling multiple versions of a computer program. One problem is that storing multiple versions of a program requires a large amount of storage space. Another problem is that different versions of the program have to have different names which requires administrative coordination in a multi-user system in which different versions of the programs are being used by different individuals.

Software users also typically prefer to have access to more than one version of a program. However, before discussing some conventional methods for providing more than one version and their associated drawbacks, the reasons behind why there are typically multiple versions of a program will be briefly discussed.

In order to manage development of a computer program, a software developer often modularizes the computer program into several interrelated modules. For example, the developer of a large data processing program might divide a program into separate main, read, compute and print modules. Accordingly, the main, read, compute and print modules contain the portions of the program pertaining to controlling the program, reading data, processing data, and printing results, respectively.

When the program reaches the commercial environment, it becomes a product and has a product life cycle. During the product life cycle of a program, software developers may modify an initial revision of a module, i.e., the original version of the module. This is accomplished by creating a copy of the initial revision, changing the copy and storing the copy as a new revision. For instance, part of the program may not operate correctly and the developer may need to change a section of source code to fix the error. The developer may also wish to add an enhancement to the program. Modification of an initial module revision results in a module having two revisions and the program having two versions, the first version being generated from the initial revision and the second version being generated from the new revision.

Typically, software developers store all the module revisions for a program in one directory, i.e., a conventional system of structuring modules. For example, the module revisions needed to generate a program named "my_prog" may include modules named "main", "read", "comp" and "print". Software developers typically rename the second revision of a module, since most computer platforms, i.e., the combination of computer hardware and software, do not permit multiple files such as module revisions to exist in the same subdirectory with the same name. For instance, if the modules are written in the C programming language, the initial revision of the "read" module might be called "read.c" and stored in a directory, and the new revision might be called "read2.c" and stored in the same directory.

Additionally, software developers usually use a conventional program construction procedure, which is commonly referred to as a build procedure, to construct a version of a program from the module revisions stored in a single directory. The software developer must modify the program construction procedure to accommodate each new revision of a module. Thus, the program construction procedure, for the example above, must be modified to use "read2.c" for constructing the second version of the "my prog" program.

Software users often prefer to have both an old version and a new version of a program available. For example, the user may wish to keep the original version of the "my_prog" program since the new version of the "my_prog" program may no longer support reading an old datafile, and may wish to use the new version of the "my_prog" program in order to utilize a new enhancement that is not available with the original version. A conventional solution to providing access to both the new version and the old version is to store both versions of the program on the computer system.

However, storing two or more versions of a program on the same computer system has several drawbacks. One drawback is that storing multiple versions of a program wastes disk space. This drawback is particularly pronounced when each version is very large. For instance, four versions of an original 80 MB program might require 320 MB of disk space if all versions are to be stored.

Another drawback is that many computer platforms prohibit two versions of a program from existing together in the same subdirectory with the same name, as described earlier with respect to storing multiple module revisions on the same computer platform. One solution to overcome this drawback is for the user to rename the second version of the program so that both versions can be stored in the same subdirectory. However, this solution creates other drawbacks if the version is invoked or "called" by a another program referred to as a "calling" program.

A user typically modifies a calling program each time the user wishes to have the calling program use a different version of the called program. In the example above, where the first version of the "my_prog" program is named "my_prog" and the second version is named "my_prog2", the user would typically change a variable of the calling program from "my_prog" to "my_prog2". However, this cannot be done if the version name is "hardcoded" into the calling program, i.e., if the calling program is in executable form and cannot be modified.

Another solution is to store each version of the called program in a different directory. In this case, the user must swap the versions between directories so that the calling program uses the correct version of the called program. Alternatively, different paths may be specified or the directory must be specified. Additionally, the user must remember where each version of the called program is located and which version is presently being used. It should be apparent that this solution requires a considerable amount of time and effort from the user. An additional problem is that sometimes a program expects that data used by it is located in a directory relative to the directory in which the program is found. That is, generally speaking, a program assumes that it operates and exists in a particular environment. This assumption is hard-coded in the program.

In view of the above-described drawbacks to the conventional system, it would be very useful to provide a system that enables a user to access multiple versions of a program while saving disk space. Furthermore, it would also be very useful to provide a system that reduces the amount of time and effort that a user expends when making a calling program use a new version of a called program.

SUMMARY OF THE INVENTION

To overcome these problems and limitations, a version update management system improves storage space usage and enables calling programs to invoke any version of a program using the same name by storing only modified modules of different versions of the computer program and by constructing a version of the program from these modules upon command. A user may easily construct a particular version of the program by invoking a program construction procedure and passing a version number corresponding to the requested version as a parameter. Alternatively, the program construction procedure may be invoked by a calling program. Optionally, the program construction procedure automatically invokes the version of the program after completing construction thereby either saving the user time and effort normally needed to invoke the program manually or saving the calling program from having to issue two instructions, one to invoke the program construction procedure and the other to invoke the constructed version of the program.

This invention improves storage space usage since each version of the program does not need to be permanently stored in memory. Thus, only modified modules need to be stored. Furthermore, if a calling program invokes the program construction procedure, the calling program may invoke any constructed version of the program by the same name since only the version to be invoked needs to exist at any time. Accordingly, problems related to storing multiple versions of a program in the same directory using the same name are avoided. Thus, in the above example, only 70–85 MB of storage is required as compared to 320 MB.

Accordingly, in one aspect of the invention, the system comprises a configuration unit that stores a plurality of version entries, each version entry corresponding to a constructable version of the program. The system further comprises a plurality of revision units, each revision unit selecting a module revision from a plurality of module revisions of a module. The system also includes a program generator that receives a version number indicating the version of the program to be constructed, reads a version entry from the configuration unit according to the version number, activates each revision unit of the plurality of revision units to select module revisions from the modules according to the version entry, and generates the version of the program from the selected module revisions. The program is constructed when the version is generated.

In another aspect of the invention, the system comprises a memory device that stores logic signals, and a processor that reads the logic signals from the memory device. The processor receives the version number of the program to be constructed, accesses a version entry from a configuration table having a plurality of version entries according to the version number, selects a set of module revisions from a module repository having a plurality of module revisions according to the version entry, and generates the version of the program from the selected set of module revisions to construct version of the program.

In yet another aspect of the invention, an apparatus comprises a module repository having a plurality of subdirectories, each subdirectory including at least one module revision. The apparatus further includes means for selecting a set of module revisions from the module repository according to a set of revision numbers; and means for receiving the version number, activating the means for selecting, providing the set of revision numbers to the means for selecting according to the version number, and generating the version of the program from the selected set of module revisions to construct the version of the program.

In another aspect of the invention relates to a computerized system for automatically executing a version of a program. This aspect involves the system comprising means for receiving a version number of the program to be executed; means for selecting a set of module revisions from a module repository according to the version number; means for generating a program from the selected set of module revisions; and means for executing the generated program.

Another aspect of the invention is directed to an apparatus for constructing a version of a program having a plurality of versions, each version being defined by a set of modules, each module having at least one module revision. The apparatus comprises a module repository having a plurality of subdirectories, each subdirectory corresponding to a module of the set of modules, each subdirectory having at least one file corresponding to a module revision. The apparatus also includes a program generator that selects the set of modules, retrieves the module revisions, and generates the version of the program from the retrieved module revisions. The version is constructed when the program is generated.

BRIEF DESCRIPTION OF THE DRAWING

The present invention will be more completely understood through the following detailed description which should be read in conjunction with the attached drawing.

DETAILED DESCRIPTION

Figure 1A:
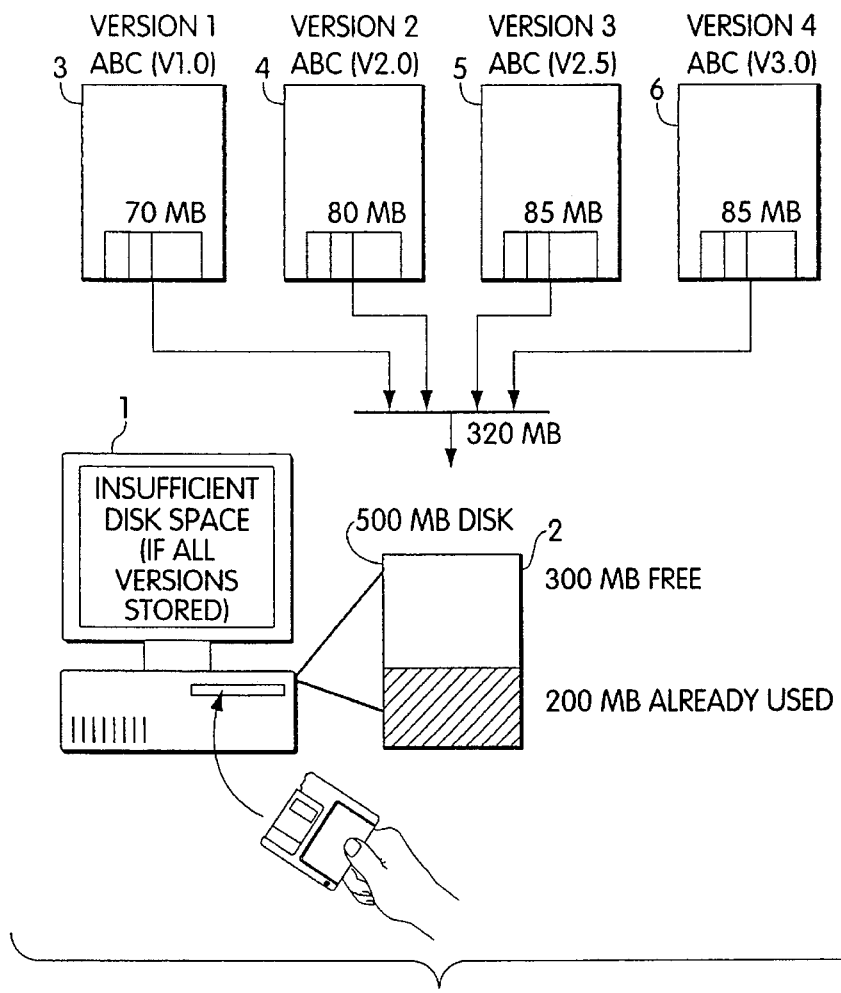
FIG. 1A is a diagram illustrating memory use in the prior art for storing multiple versions of a computer program.

Referring now to FIG. 1A, if a computer 1 includes a 500 MB disk 2 in which 300 MB are free and 200 MB are already used, and a user wants to add four versions of a program "ABC" as indicated at 3, 4, 5 and 6, and requiring a total of 320 MB, there will be insufficient disk space. Also, the user will have to be concerned about the naming of the versions that can be stored within the free disk space.

In contrast, with the present invention there is a module repository 7 in which the non-redundant modules of the different versions of programs are stored, as indicated at M1, M2, M3, M4, and M4'. A program generator 8, in response to a request for a version of program "ABC", accesses the appropriate modules in the module respository to generate an executable version of the program named "ABC". This process reduces the amount of disk space used and eliminates the need to rename different versions of the same program. The program generator may access the appropriate modules from the module repository according to a table indicating the correspondence between modules and versions of the program, as will be described in more detail in FIG. 1C.

Figure 1B:
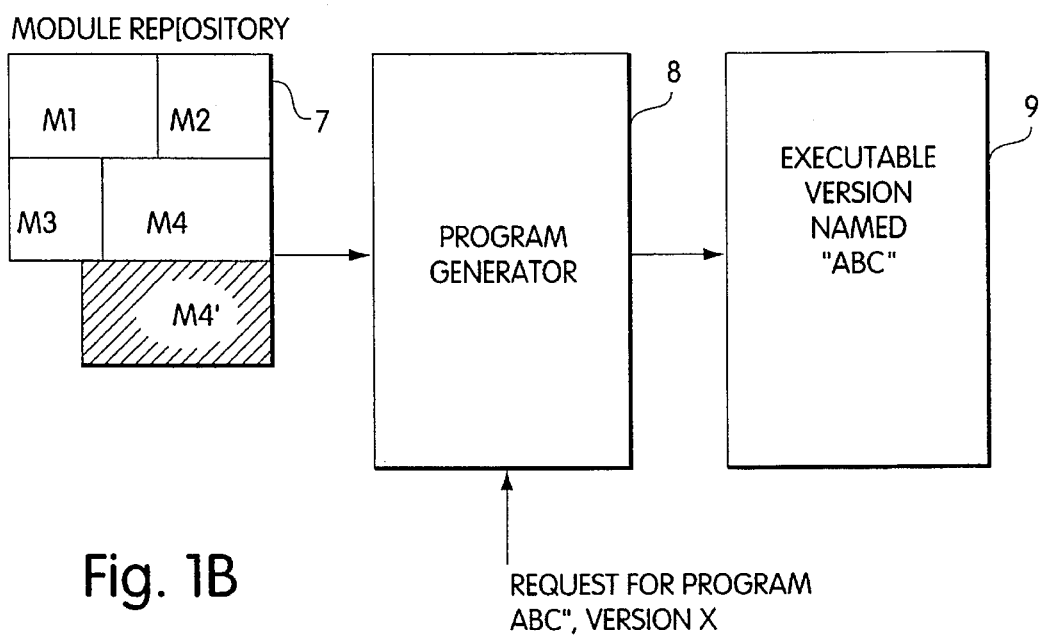
FIG. 1B is a block diagram illustrating one embodiment of the present invention for storing multiple versions of a computer program.
Figure 1C:
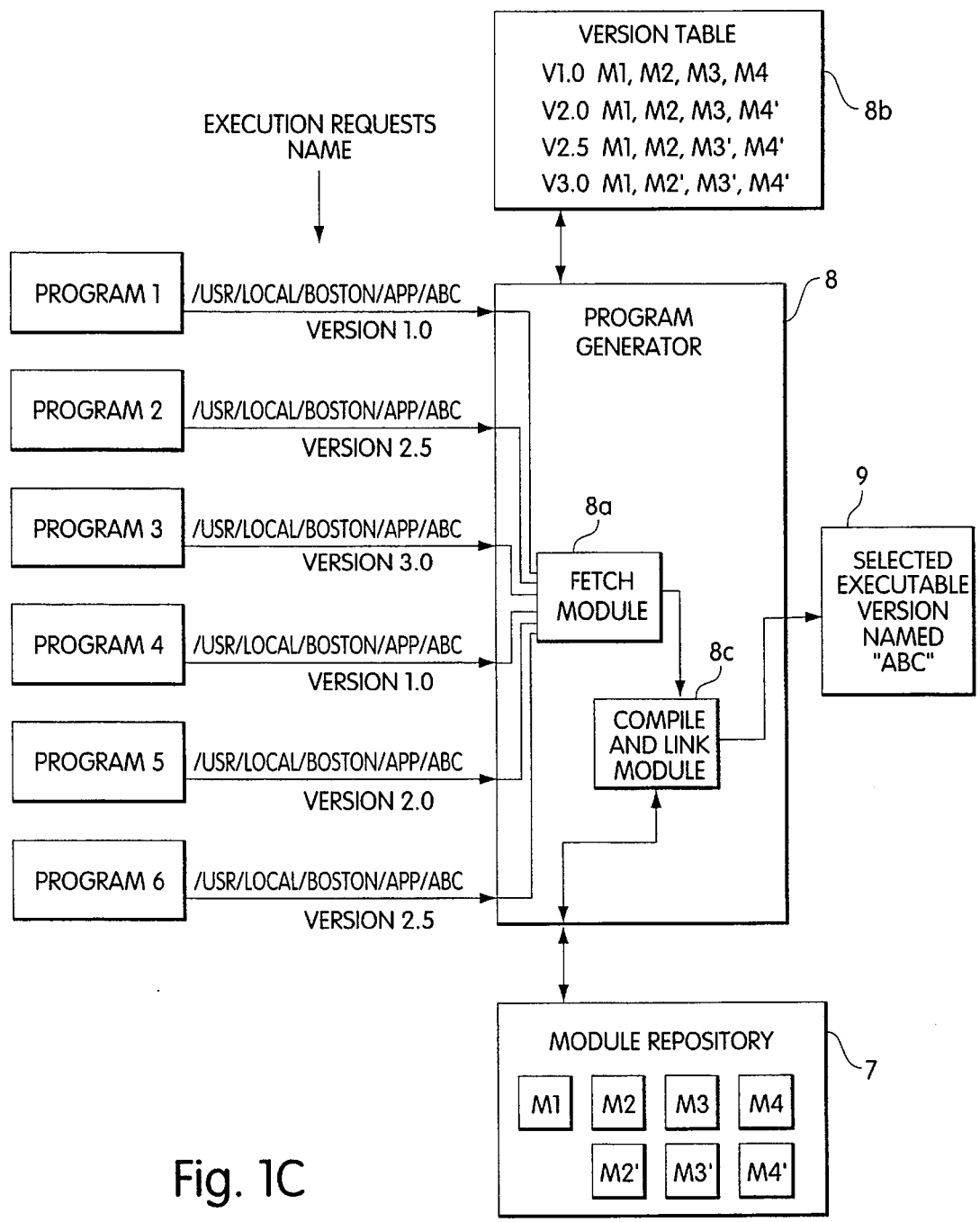
FIG. 1C is a more detailed diagram of FIG. 1B.

In FIG. 1C, a number of programs, referenced to as "program 1" through "program 6", provide execution requests indicating a name of a program, e.g., "ABC," and a version number to the program generator 8. A program generator includes a fetch module 8A which retrieves a list of modules from a conversion table 8B according to the version of the program indicated in the execution request being processed. Upon receipt of the version list, the program generator gives the version list to a compile and link module 8C which selects modules from the module repository 7, compiles them (if necessary) and then links the compiled modules to create the executable version. The executable version of the program is named, for example, "ABC", as indicated at 9. This name is independent of the version number.

Figure 1D:
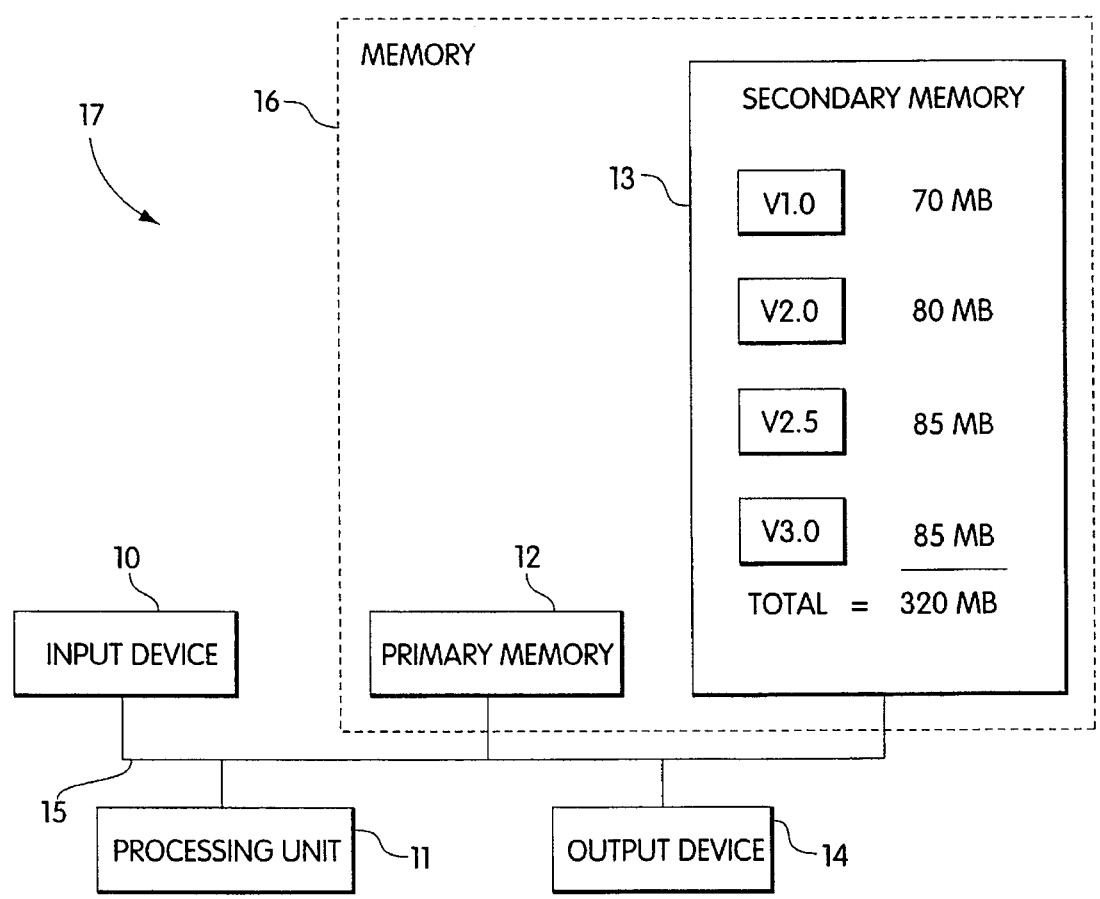
FIG. 1D is a block diagram of a conventional computer system using a conventional program structure.

More particularly, referring now to FIG. 1D, this figure shows a conventional computer system 17 storing multiple versions of a program. Input device 10 enables a user to enter data and commands into the system 17. Input device 10 may take the form of a keyboard, mouse, scanner, modem, network interface or any other device that provides data and commands to the system. Processing unit 11 receives data and commands from the input device 10 through system bus 15. The processing unit 11 performs a number of operations including running an operating system to manage system resources, executing commands received from the input device and running programs stored in memory 16. Memory 16 comprises primary memory 12 and secondary memory 13. Primary memory 12 typically refers to electronic circuit memory that very quickly receives and provides information in the form of logic signals. Secondary memory 13 refers to non-volatile storage media such as magnetic, magneto-optical and optical disk, magnetic tape and the like, which store information for longer periods of time but respond more slowly than the primary memory 12. Also coupled to processing unit 11 via bus 15 is output device 14 that displays output from the processing unit. Output device 14 includes any conventional output device such as a video display or printer that conveys information back to a user.

By way of example, FIG. 1D shows secondary memory 13 as storing multiple versions of a program ABC. In particular, the four versions of program ABC are V1.0, V2.0, V2.5, and V3.0, as shown in FIG. 1D with their respective memory storage sizes in megabytes (MB), shown by way of example. Each of the four versions of a program ABC V1.0, V2.0, V2.5 and V3.0 are shown in FIG. 1D as being stored in secondary memory 13. Storing these versions in this example requires a total of 320 MB of storage space. Each program version is stored using a different name.

Having described a conventional system for structuring modules and for constructing a program, and the associated drawbacks, the present invention will be discussed hereinbelow.

It should be noted that the invention applies not only to a conventional computer system 17, as shown in FIG. 1D, but also to many other types of computer configurations including mainframes, workstations, personal computers, distributed environments, computers using multiple portions on a disk and network file systems, and the like.

Figure 2:
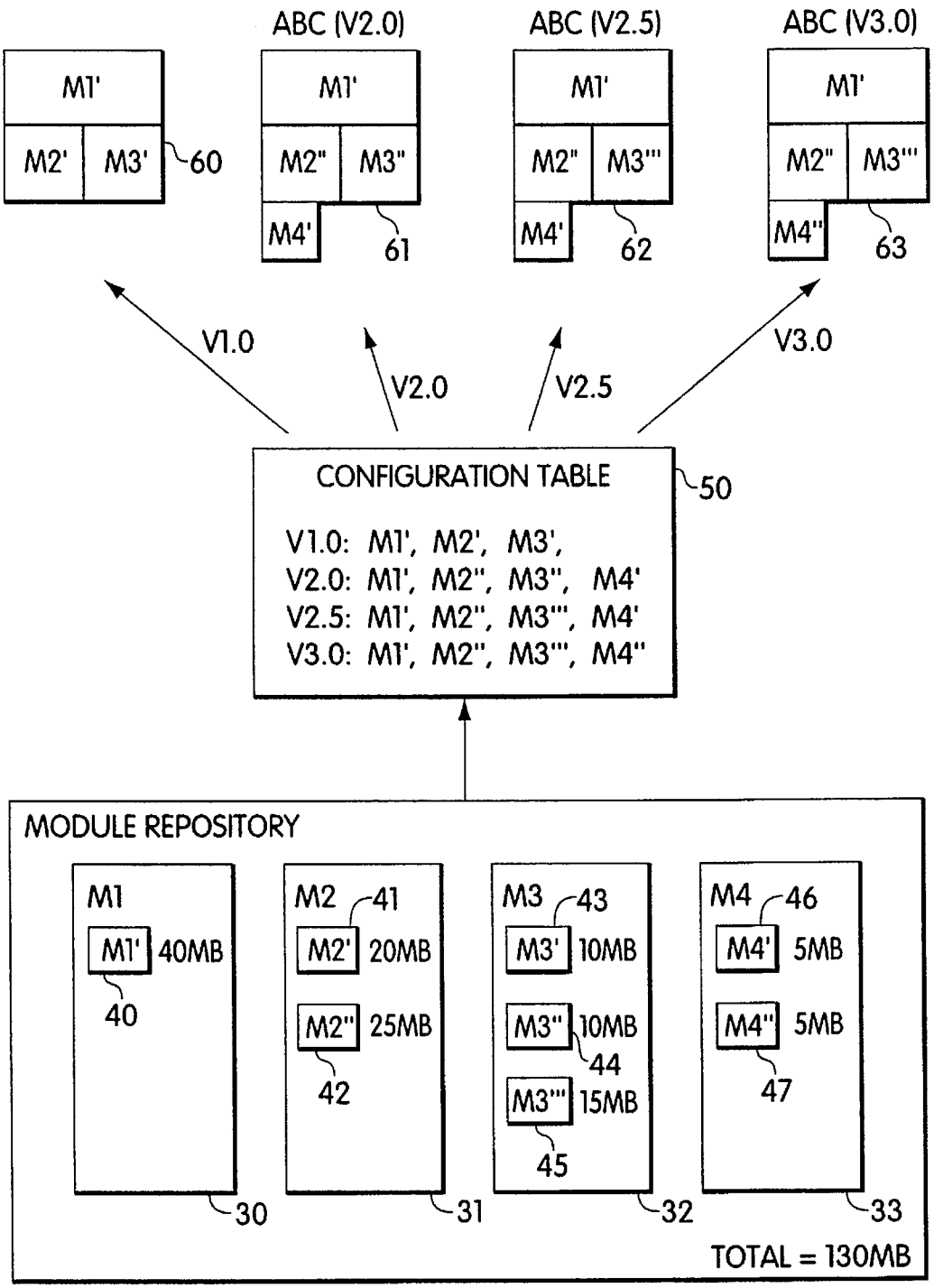
FIG. 2 is a diagram illustrating a relationship between components of the invention and four versions of a program, by way of example, in accordance with an embodiment of the invention.

FIG. 2 is a diagram illustrating a relationship between some components of the invention according to an embodiment. In the invention, the computer stores module revisions in a module repository 20 having a subdirectory for each module. The module repository 20 is located on secondary memory 13. By way of example, the secondary memory 13 stores module repository 20 having module revisions M1', M2', M2", M3', M3", M3''', M4' and M4" and using 130 MB of storage space as shown in FIG. 2. By way of example, the module revisions which would have been used when constructing versions of the program ABC in the above-described conventional example are shown stored in subdirectories 30, 31, 32 and 33. M1' is stored in the M1 subdirectory 30; M2' and M2" are stored in the M2 subdirectory 31; M3', M3" and M3''' are stored in the M3 subdirectory 32; and M4' and M4" are stored in the M4 subdirectory 33. The total storage space required for these modules is 130 MB which is significantly less than the amount for the conventional example.

Thus, in this example, none of the versions of the program ABC are constructed or stored until execution time. Accordingly, the invention saves the 190 MB of storage space (320 MB–130 MB), i.e., the difference between the amount of storage space required to store the multiple versions of the program and the storage space required to store the module repository 20 used to construct the different versions. Memory usage is reduced by eliminating storage of duplicated program code and modules.

FIG. 2 further shows a configuration table 50 that contains information on how each version of the program is to be constructed. A plurality of version entries store this information wherein each version entry corresponds to a version of the program and has a set of the module revisions to be used when constructing the particular version of the program. For example, the second entry of the configuration table 50 in FIG. 2 shows that version V2.0 of program ABC uses module revisions M1', M2', M3" and M4'.

Also shown by way of example in FIG. 2, are symbolic representations of the versions of the program 60, 61, 62 and 63. According to the invention, any of the four versions shown may be generated from the module repository 20 and the configuration table 50. Any version of the program and the configuration table may be stored either in the module repository 20 or elsewhere in the secondary memory. The preferred location to store the configuration table 50 is in a parent directory, i.e., the top level directory, of the module repository 20. The parent directory is also the preferred location for temporarily storing the constructed version of the program although the invention has the flexibility to store the version in other locations such as a utilities directory after construction is completed.

Additionally, the invention has the flexibility of enabling the module repository 20 to be located anywhere in memory. For example, using a UNIX operating system and file system, the module repository may be located in the root directory, a separate portion, a lower subdirectory, a remotely mounted network file system of another computer system, several network file systems spread across a distributed computer network, and the like.

Furthermore, the invention has the flexibility of storing the configuration table 50 either in a directory outside the module repository 20 or within the module repository 20. The preferred location for the configuration table 50 is the parent directory of the module repository 20.

Figure 3:
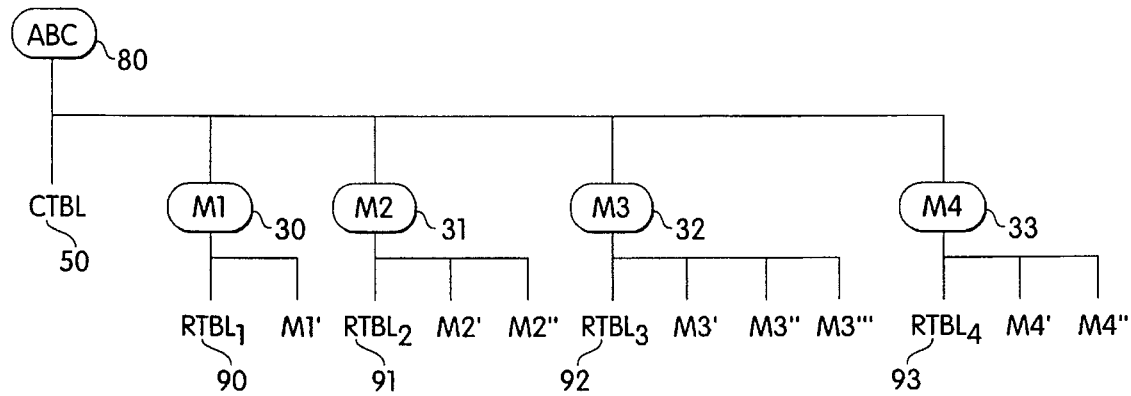
FIG. 3 is a diagram of an example of a module repository in accordance with an embodiment of the invention.

FIG. 3 shows a diagram of the directory structure of the module repository 20 for the invention using the example described above. Here, the parent directory 80 uses the same name as the program, i.e., ABC for convenience only. The configuration table, named CTBL in this example, is located in parent directory 80. The module subdirectories 30, 31, 32 and 33 shown in FIG. 2 are also shown in FIG. 3 located under the parent directory 80.

According to an embodiment of the invention, a number of revision tables are also provided. By way of example, the revision tables are named RTBL 90, 91, 92 and 93 and located in the modules subdirectories. Each revision table has at least one revision entry that matches a revision number to an actual filename in memory.

Figure 4:
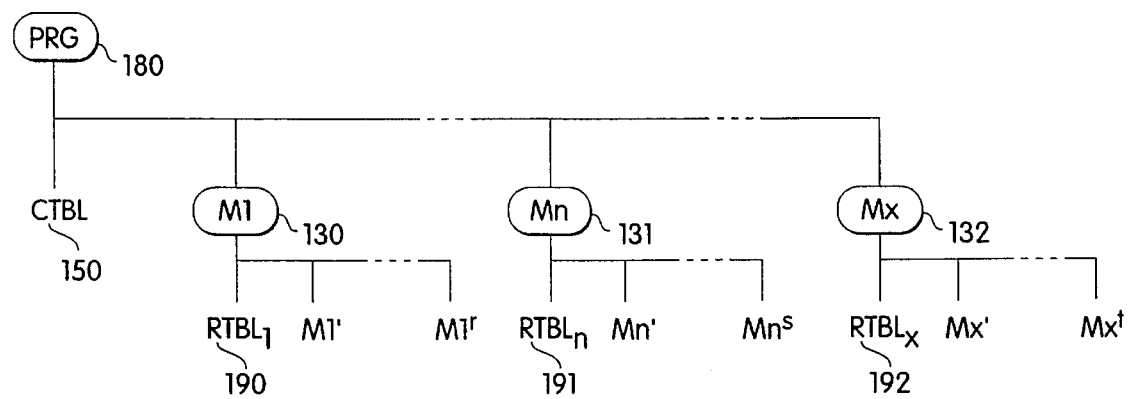
FIG. 4 is a diagram of a module repository in accordance with an embodiment of the invention.

FIG. 4 is a general diagram of the directory structure in accordance with an embodiment of the invention. As shown in FIG. 4, the parent directory 180 may take any name but preferably the name of the program for convenience purposes, e.g., PRG. The configuration table 150 contains version entries indicating which module revisions are used for each version of the program. Module subdirectories 130, 131 and 132 depict a plurality of subdirectories storing module revisions for each module of program PRG. Each module subdirectory includes a revision table 190, 191 or 192 which indicates the actual filename for a particular module revision. In the general case, there are x modules for program PRG. Module 1 has r number of revisions; module n has s number of revisions; and module x has t module revisions, wherein x, r, s and t are all positive integers.

Figure 5:
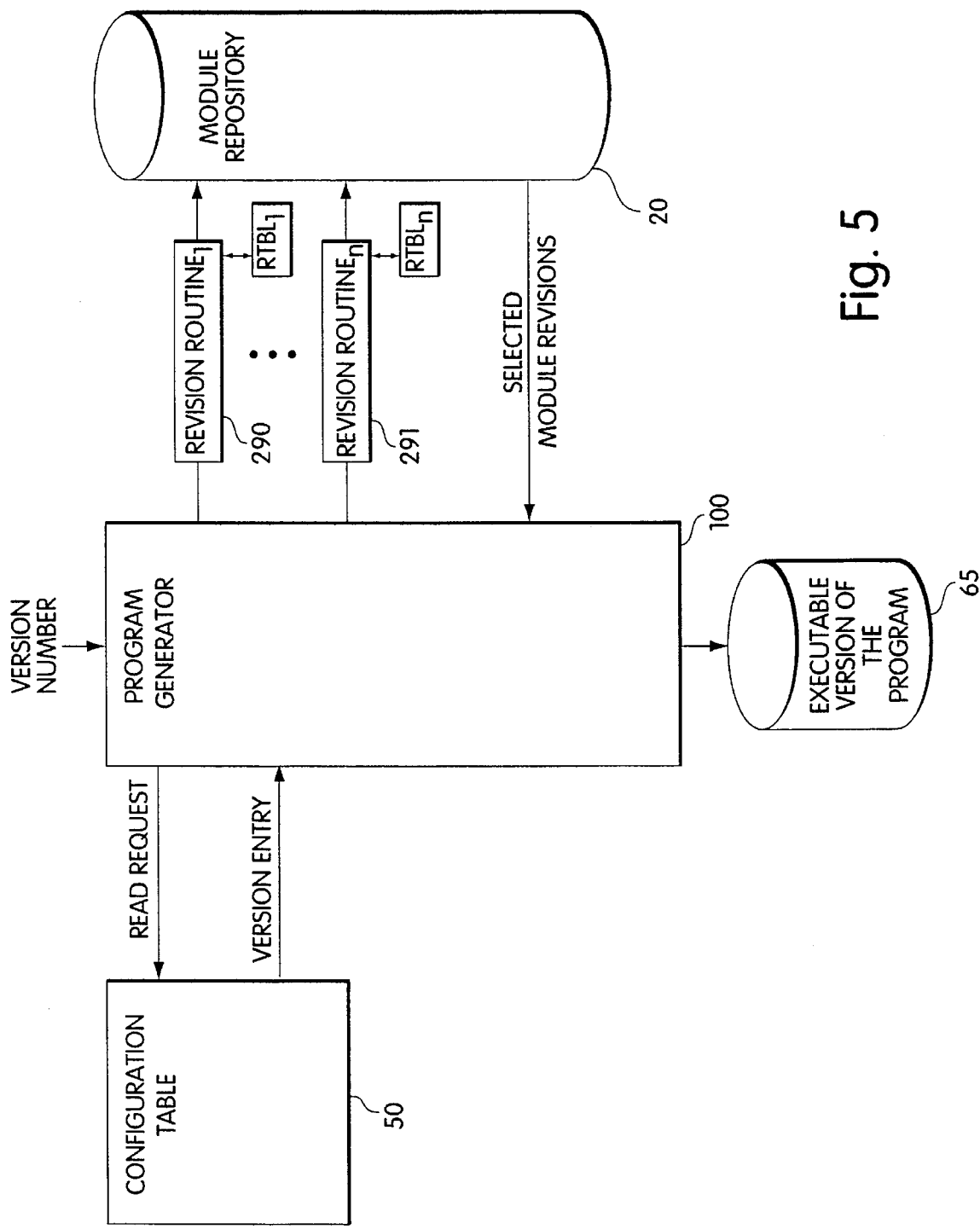
FIG. 5 is a block diagram of a system in accordance with an embodiment of the present invention.

FIG. 5, similar to FIGS. 1B and 1C above, shows a block diagram of the system in accordance with an embodiment of the invention. Program generator 100 receives a version number. The version number may be received from a user through the input device 10 or received as an argument from a calling program. As an option, if the computer system has more than one program construction procedure for constructing more than one program, the user may also pass a program name to the program generator 100 using the input device 10 to identify which program is to be constructed.

Program generator 100 interfaces with configuration table 50 by issuing a read request and receiving a version entry. Program generator 100 also interfaces with a plurality of revision routines 290, 291, etc. Each revision routine refers to the module repository 20 and more particularly to a module subdirectory by receiving a module revision number and selecting a particular filename from the module subdirectory. Additionally, the program generator interfaces with the module repository directly by issuing a program generation request, accessing a set of selected module revisions and generating a version of the program 65.

The invention according to the above described embodiments applies to constructing an executable version of the program from object modules. Each module revision may refer to an object module generated by a compiler from a source code module. For example, if the computer platform were a UNIX platform, and if the program was written using the C programming language, the module revisions would be object files having filenames ending with a ".o" extension.

Nevertheless, the invention is also applicable to constructing a version of a program when the module revisions are source code modules rather than object modules.

Having thus described the structure of an embodiment of the present invention, the operation of the embodiment will now be discussed hereinbelow.

Figure 6:
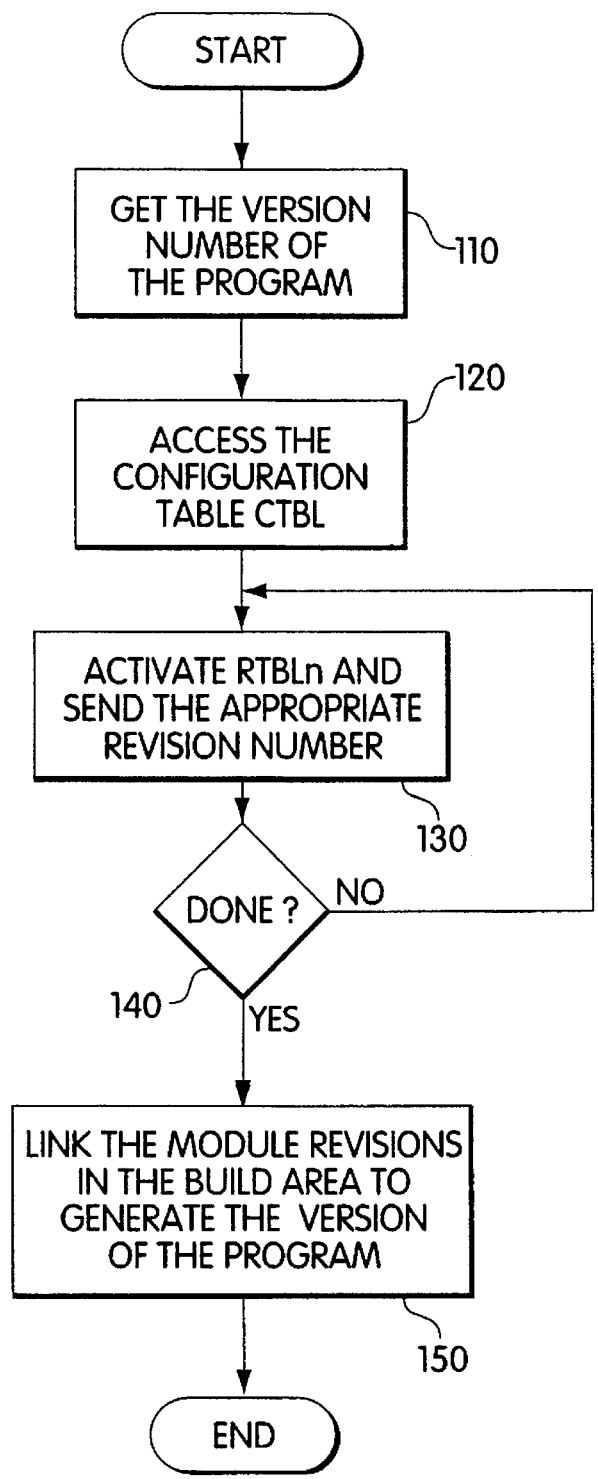
FIG. 6 is a flow chart of the operation of a program generator in accordance with an embodiment of the invention.

FIG. 6 is a flow chart describing the operation of the program generator 100 for the structure shown in FIG. 5 in accordance with an embodiment of the invention. The program generator 100 receives a version number from either a user or a calling program in step 110. The version number indicates which version of the program to construct. The program generator 100 then accesses the configuration table CTBL as shown in step 120. When accessing the configuration table, the program generator finds a version entry corresponding to the version number received in step 110. The version entry indicates which module revisions are to be used to construct the version of the program. The program generator 100 then activates a revision routine for a module and passes to the revision routine the appropriate module revision number according to the version entry as shown in step 130. The revision routine will select the appropriate module revision filename to be used when constructing the program according to the passed module revision number. This step may include copying or moving the module revision to another directory. The program generator may repeat the above step by activating another revision routine and passing to the other revision routine an appropriate module revision number for the module revision that is to be used for constructing the version of the program as shown by step 140. Once all of the module revisions have been selected, the program generator 100 links the module revisions and generates the version of the program as shown in step 150. The version of the program is deemed to be constructed when the generation phase of step 150 is complete.

Figure 7:
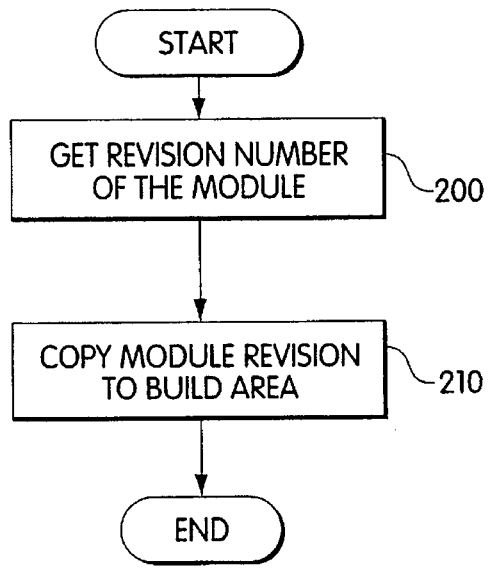
FIG. 7 is a flow chart of the operation of a revision unit in accordance with an embodiment of the invention.

The operation of the revision routines will now be discussed in more detail. FIG. 7 shows a flow chart of the operation of a revision routine for a module when the module revisions are object modules. The revision routine receives a revision number from the program generator 100. The revision number indicates which revision of the module to be used. The revision routine then accesses a revision table corresponding to the module and finds the filename for the module revision to be used. The revision routine copies the file to a build area as shown in step 210 before returning control to the program generator. The build area is a subdirectory in memory that stores the module revisions to be used when constructing the program.

Figure 8:
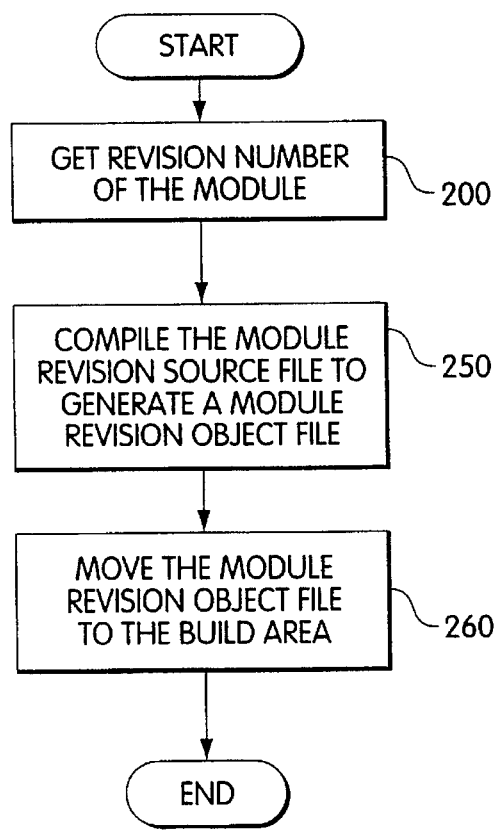
FIG. 8 is a flow chart of the operation of an alternative revision unit in accordance with an embodiment of the invention.

FIG. 8 shows the operation of the revision routines when the module revisions are source modules. The revision routine receives the revision number as shown in step 200. Then, the revision routine compiles the appropriate source module according to the revision number to generate an object module as shown in step 250. The revision routine then moves the object module to the build area as shown in step 260, and returns control to the program generator 100.

When the version of the program is constructed, the program generator will name the program with a general name independent of the version number. This naming convention is achievable without any drawbacks because the user or calling program requesting the version plans to use the requested version and no other version simultaneously. Therefore, there can be no conflict arising from trying to store different versions in the same subdirectory with the same name. As an option, the version may be deleted immediately after execution to recover disk space.

Figure 9:
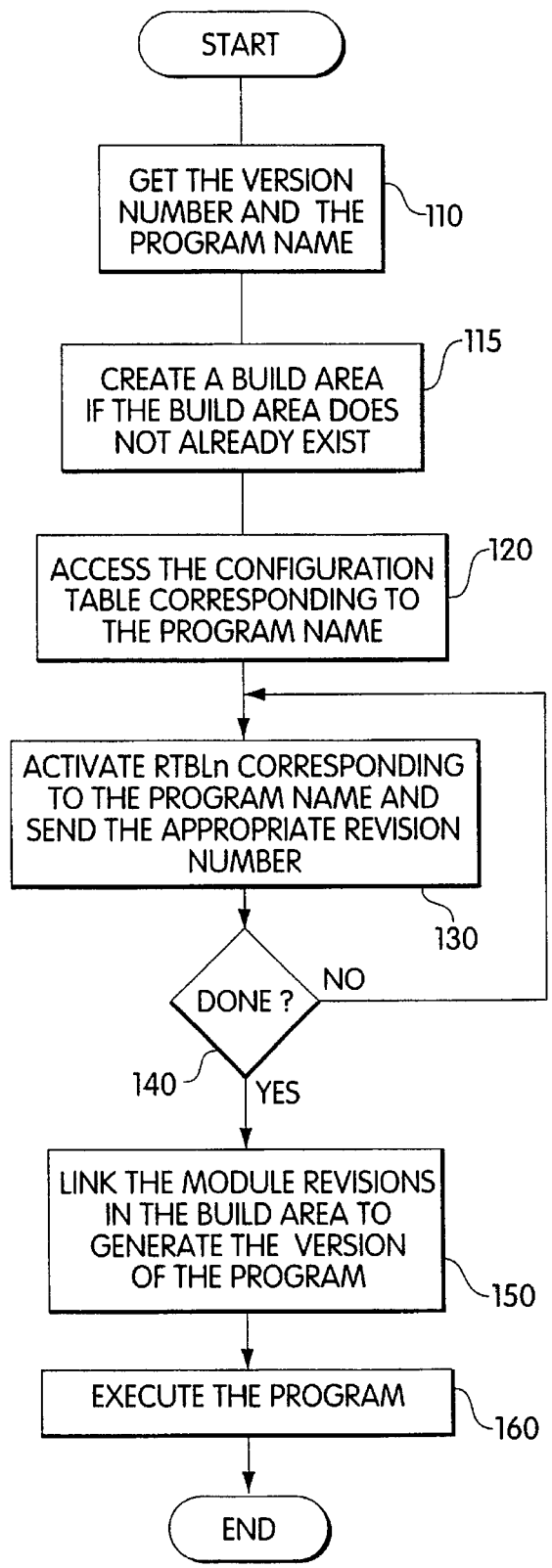
FIG. 9 is a flow chart of the operation of an alternative program generator in accordance with an embodiment of the invention.

FIG. 9 shows a flow chart of the operation of the program generator 100 including a few options. Specifically, this operation creates the build area if it does not already exist as shown in step 115. Additionally, this embodiment automatically executes the version of the program once it is generated as shown in step 160. These options are independent and, therefore, may be included one at a time or together in an embodiment.

Other options also may be included such as automatically deleting any existing versions of the program before generating the version, moving the version of the program to a new subdirectory after it is generated, and receiving additional arguments and passing them to the version of the program when the program is automatically executed. Furthermore, the program generator may wish to delete all the module revisions stored in the build area after constructing the version of the program.

Figure 10:
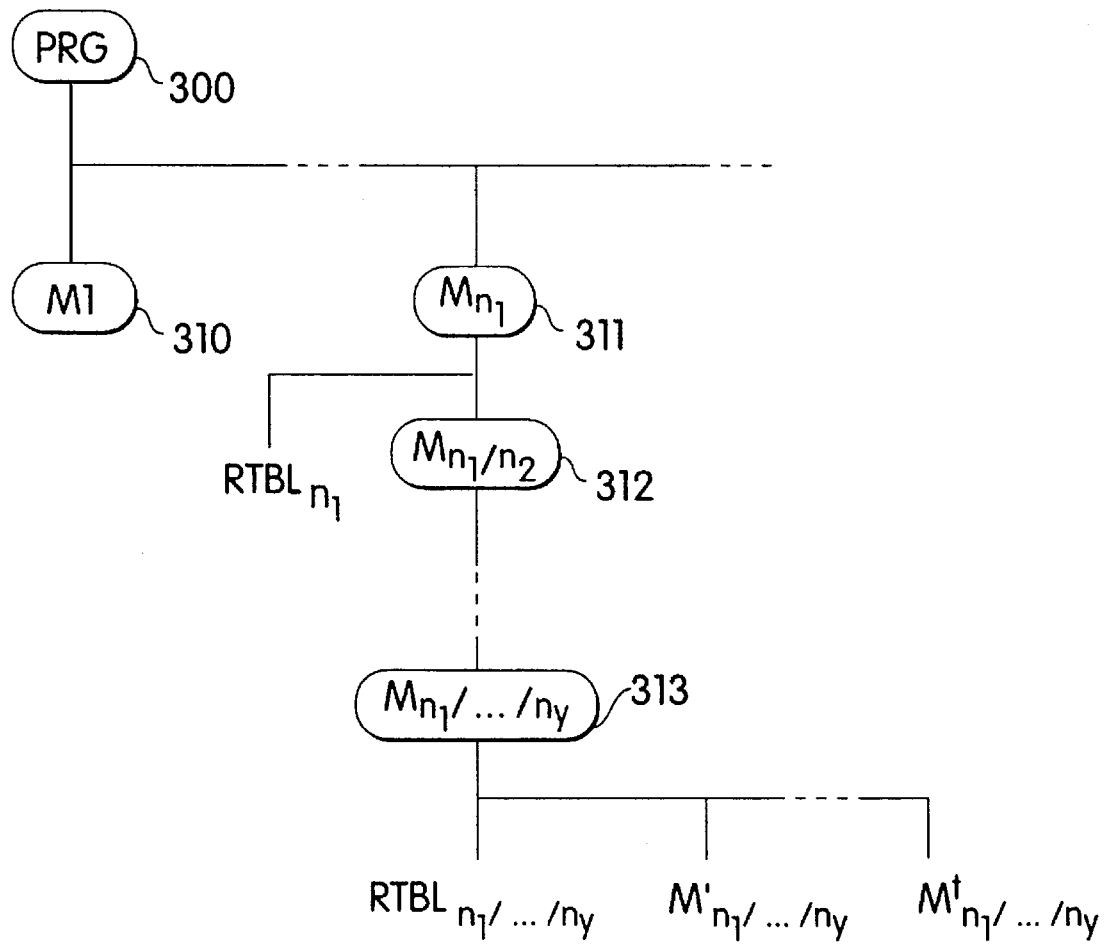
FIG. 10 is a diagram of a module repository in accordance with an embodiment of the invention.

FIG. 10 shows a diagram of a directory structure in accordance with another embodiment of the invention. In this embodiment, the module repository has multi-layered subdirectories 310, 311, etc. branching from the parent directory. The intermediate subdirectories such as 312 are considered branches and contain entries pointing to lower level subdirectories. Thus, this structure is recursive. The lowest subdirectory of each branch, such as subdirectory 313, contains the program modules. Both the intermediate subdirectories and the lowest subdirectories contain revision routines.

Figure 11:
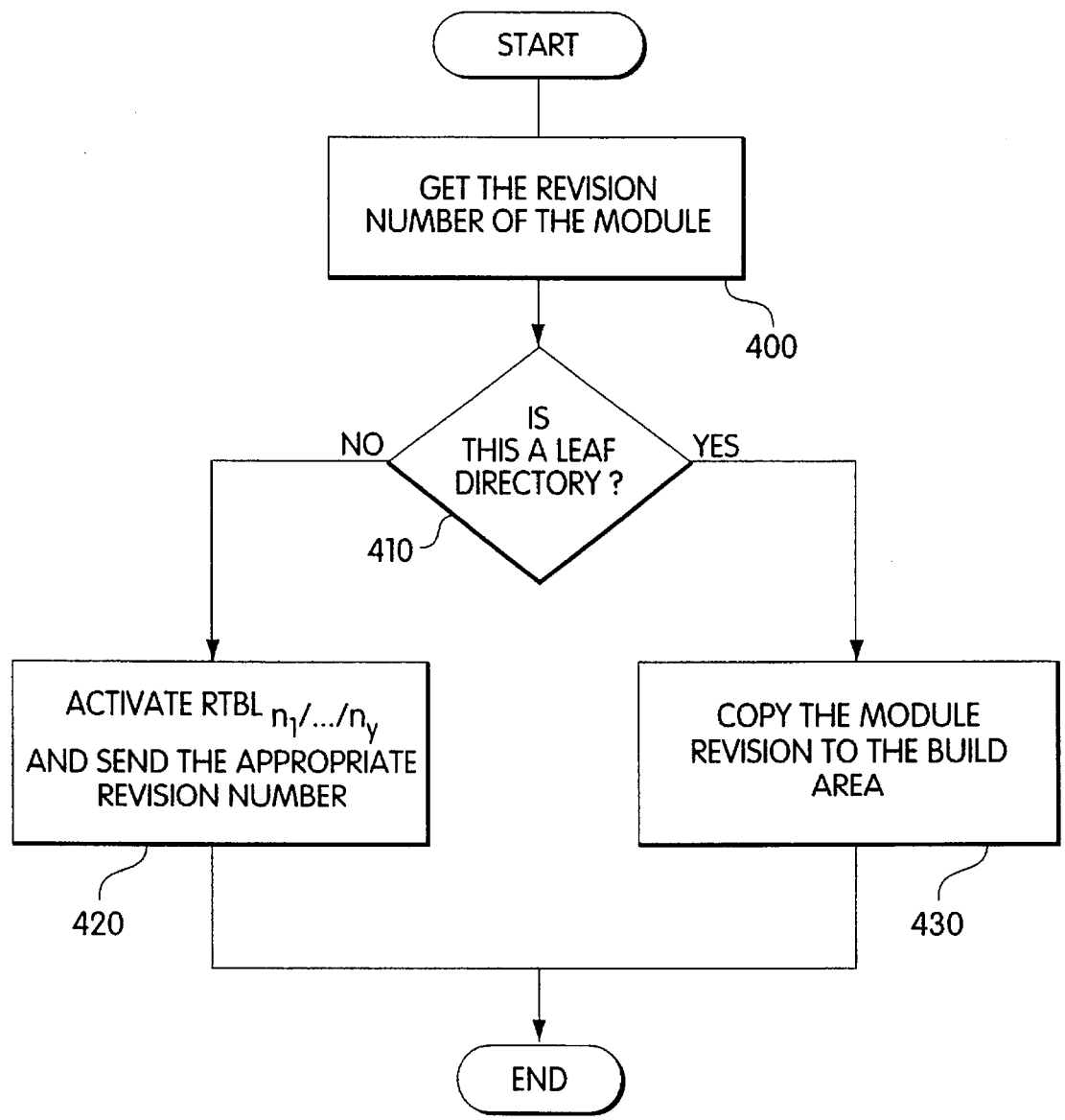
FIG. 11 is a flow chart of the operation of a revision unit in accordance with an embodiment of the invention.

The second embodiment may use the same program generator 100 to activate revision routines in the subdirectories located within the first level as shown in FIG. 5 and described above. However, each revision routine is recursive and operates as shown in FIG. 11. The revision routine receives the revision number of the module as shown in step 400. Then, the revision routine tests to see whether the current subdirectory is a branch or a leaf directory as shown in step 410. If implementing this embodiment on a UNIX system using a shell script, a simple "if" statement using the "test" command accomplishes this test step. If the subdirectory is a branch directory, the operation shifts to step 420 and the revision routine recursively activates another revision routine located in a lower subdirectory. If the subdirectory is a lowest directory, the operation shifts to step 430 and the module revision is either copied or moved to the build area. Finally, control returns to the program generator.

Numerous other variations of the above-described embodiments can be implemented according to the type of computer platform using the invention. For example, the program generator 100 and revision routines 190, 191, etc.

may be implemented in the form of a shell scripts on UNIX platforms. Also, the configuration table 50 may be stored within the same shell script in the form of a matrix or series of variables to reduce the number of file accesses. Similarly, the revision tables may be combined and stored within the revision routines. Furthermore, rather than construct executable programs, the invention may be applied towards constructing command files, data files, object libraries, text libraries and similarly constructed collections of data and/or code.

In another variation, the module repository may be stored in a compressed format, decompressed during the module creation process, and recompressed after the module creation process has completed. This variation may be implemented using conventional compression and decompression tools such as pkzip.exe and pkunzip.exe, respectively, which are available on many personal computers.

With this invention large amounts of disk space may be saved since versions of programs no longer need to be permanently stored in memory. Furthermore, the amount of effort required by a user when switching between called versions is reduced since situations of trying to store different versions with the same name in the same directory are now avoided and version construction and execution is automated.

The Appendix shows an example of several components of an embodiment of the present invention implemented with shell scripts on a UNIX platform. The UNIX platform consists of an HP720 computer available from Hewlett-Packard of Palo Alto, Calif., using the HP-UX operating system, version 9.03. Example 1 shows, by way of example, an output generated by the shell scripts. Example 2 is a shell script that invokes the program generator. Example 3 is the program generator that contains the configuration table within a "switch" statement. Optionally, the configuration statement may be stored in a separate file which is accessed by the program generator. Examples 4–7 show revision routines which are invoked by the program generator. Additionally, the shell script shown in Example 2 shows, as an option, a command that automatically invokes the program with arguments once the program generator has completed constructing the program.

This invention applies to multi-user environments such as large mainframe computer systems which service many users simultaneously. Multiple users wishing to access different versions of the same program may construct the program using any embodiment discussed above, and optionally moving the constructed version to a private directory for personal access. In this case, each user may access a different version of the program without any inconvenience, particularly if the private directory belongs to the user's search path.

Having now described a few embodiments of the invention, and some modifications and variations thereto it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as limited only by the appended claims and equivalents thereto.

APPENDIX

Example 1: Output

\*\*\* Current Directory

```
nausica:ohkami[1] pwd
/tmp_mnt/homes/ohkami/doc/patent/prog2
```

\*\*\* Directory Structure

```
nausica:ohkami[2] ls -R
Execute*    prog/        typescript

./prog:
comp/   ctbl*   main/   print/   prog*   read/

./prog/comp:
Makefile   comp.o   comp_0.c   comp_1.c   ctbl*

./prog/main:
Makefile   main.o    main_1.c   prog_0.h   prog_2.h
ctbl*      main_0.c  main_2.c   prog_1.h ./prog/print:
Makefile   ctbl*      print.o   print_0.c   print_1.c   print_2.c ./prog/read:
Makefile   ctbl*      read.o    read_0.c    read_1.c    read_2.c
```

\*\*\* Make prog(version 0)

```
nausica:ohkami[3] Execute prog v0
-- Modules: main read comp print
-- main v0
        cc -Aa -c main_0.c
-- read v0
        cc -Aa -c read_0.c
-- comp v0
        cc -Aa -c comp_0.c
-- print v0
        cc -Aa -c print_0.c
... main<v0>
... read<v0>
... comp<v0>
... print<v0>
```

```
*** Make prog(version 1)

nausica:ohkami[4] Execute prog v0
-- Modules: main read comp print
-- main v0
        cc -Aa -c main_0.c
-- read v1
        cc -Aa -c read_1.c
-- comp v1
        cc -Aa -c comp_1.c
-- print v0
        cc -Aa -c print_0.c
... main<v0>
... read<v0>
... comp<v0>
... print<v0>
<<< Usage: comp n

*** Make prog(version 2)

nausica:ohkami[5] Execute prog v1
-- Modules: main read comp print
-- main v1
        cc -Aa -c main_1.c
-- read v1
        cc -Aa -c read_1.c
-- comp v1
        cc -Aa -c comp_1.c
-- print v1
        cc -Aa -c print_1.c
... main<v1>
... read<v1>
... comp<v1>
... print<v1>
<<< Usage: comp n

*** Make prog(version 3)

nausica:ohkami[6] Execute prog v2
-- Modules: main read comp print
-- main v2
        cc -Aa -c main_2.c
-- read v2
        cc -Aa -c read_2.c
-- comp v1
        cc -Aa -c comp_1.c
-- print v2
        cc -Aa -c print_2.c
... main<v2>
... read<v2>
... comp<v1>
... print<v2>
<<< Usage: comp [-p] n

*** Done - exit nausica:ohkami[7] exit
exit
```

```
                   Example 2:  A Shell Script

========================================================================
=== File: Execute

#!/bin/csh

# $1: program name
# $2: program version
$3-$9: program arguments cd $1
ctbl $2
if ( -e $1 ) $1 $3 $4 $5 $6 $7 $8 $9
endif
cd ..

end of file

Example 3:  A Program Generator

========================================================================
=== File: prog/ctbl

#!/bin/csh
ctbl for prog set MODULES = (main read comp print)
echo "-- Modules: $MODULES"

switch ($1)
case v0:
        set VRSN = (v0 v0 v0 v0)
        breaksw
case v1:
        set VRSN = (v0 v1 v1 v0)
        breaksw
case v2:
        set VRSN = (v1 v1 v1 v1)
        breaksw
case v3:
        set VRSN = (v2 v2 v1 v1)
        breaksw
endsw set VRSN = (dummy $VRSN)
set OBJS = ()

rm -f prog foreach mod ($MODULES)
  shift VRSN
  echo -- $mod $VRSN[1]
  cd $mod
  rm -f *.o
  ctbl $VRSN[1]
  cd ..
  set OBJS = ($OBJS $mod/$mod.o)
end
```

```
cc -o prog $OBJS ctbl - end of file
```

Example 4: A Revision Routine

```
========================================================================
=== File: prog/main/ctbl

#!/bin/csh
ctbl for main switch ($1)
case v0:
        set OBJ = main_0.o
        breaksw
case v1:
        set OBJ = main_1.o
        breaksw
case v2:
        set OBJ = main_2.o
        breaksw
endsw make $OBJ
mv $OBJ main.o ctbl - end of file
```

Example 5: A Revision Routine

```
========================================================================
=== File: prog/read/ctbl

#!/bin/csh
ctbl for read switch ($1)
case v0:
        set OBJ = read_0.o
        breaksw
case v1:
        set OBJ = read_2.o
        breaksw
case v2:
        set OBJ = read_2.o
        breaksw
endsw make $OBJ
mv $OBJ read.o ctbl - end of file
```

Example 6: A Revision Routine

```
======================================================================
=== File: prog/comp/ctbl

#!/bin/csh
ctbl for comp switch ($1)
case v0:
        set OBJ = comp_0.o
        breaksw
case v1:
        set OBJ = comp_1.o
        breaksw
case v2:
        set OBJ = comp_2.o
        breaksw
endsw make $OBJ
mv $OBJ comp.o ctbl - end of file
```

Example 7: A Revision Routine

```
======================================================================
=== File: prog/print/ctbl

#!/bin/csh
ctbl for print switch ($1)
case v0:
        set OBJ = print_0.o
        breaksw
case v1:
        set OBJ = print_1.o
        breaksw
case v2:
        set OBJ = print_2.o
        breaksw
endsw make $OBJ
mv $OBJ print.o ctbl - end of file
```

I claim:

1. A system for constructing an executable version of a program having a plurality of versions, each of said versions being made up of compiled modular program portions constituting replaceable parts, with said parts including a set of data and procedures, comprising;

a configuration unit for storing a plurality of executable version entries, each entry representing an executable version of said program and specifying the ones of said replaceable parts required to construct the executable version of said program;

means for storing a plurality of said modular program portions in compiled form as module revisions;

a plurality of module revision units, each revision unit selecting a module revision from said plurality of module revisions;

a version identifier indicating the executable version of the program to be constructed; and, a program generator for receiving said version identifier, for reading a version entry from said configuration unit corresponding to said version identifier, for activating each of said revision units to select module revisions corresponding to said version identifier, and for generating the complete executable form of said program from selected module revisions.

2. An apparatus for constructing an executable version of a program having a plurality of versions, each executable version being constructable from a set of modular revisions comprising:

a repository having a plurality of subdirectories, each subdirectory including at least one previously compiled executable previously compiled modular revision;

means including means for generating a set of revision numbers corresponding to a desired previously compiled executable version of said program for selecting a set of executable revisions from said repository according to said set of revision numbers; and, means for receiving said version number, activating said means for selecting, providing the set of revision numbers to the means for selecting according to said version number, and generating the executable version of the program from the selected set of revisions to construct the executable version of the program.

* * * * *